(12) United States Patent
Suda et al.

(10) Patent No.: US 8,766,569 B2
(45) Date of Patent: Jul. 1, 2014

(54) DRIVE DEVICE FOR SINGLE-PHASE SERIES COMMUTATOR MOTOR

(75) Inventors: Hidekazu Suda, Anjo (JP); Katsuhito Fujinami, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 13/437,390

(22) Filed: Apr. 2, 2012

(65) Prior Publication Data

US 2012/0256570 A1 Oct. 11, 2012

(30) Foreign Application Priority Data

Apr. 5, 2011 (JP) .................................. 2011-083721

(51) Int. Cl.
*H02P 3/06* (2006.01)
(52) U.S. Cl.
USPC ............ 318/244; 318/246; 318/245; 318/250
(58) Field of Classification Search
None
See application file for complete search history.

(56) References Cited

U.S. PATENT DOCUMENTS 3,628,112 A * 12/1971 Gross ............................ 318/258
2009/0267544 A1* 10/2009 Lee ................................ 318/380

FOREIGN PATENT DOCUMENTS

DE 40 22 637 A1 1/1992
JP B2-2735771 4/1998

* cited by examiner

*Primary Examiner* — Eduardo Colon Santana
*Assistant Examiner* — Devon Joseph
(74) *Attorney, Agent, or Firm* — Oliff PLC

(57) ABSTRACT

A drive device of the present invention includes a pair of drive switches, a first diode, a switching element, a current detection unit, a capacitor, a second diode, and a current control unit. The first diode, the switching element, and the current detection unit are arranged, in this order from one end of an armature in a motor, on a braking current path that is formed of the armature and a field winding in the motor when the pair of drive switches is in a brake position. The second diode is adapted to keep allowing a braking current to flow through the field winding when the switching element is in an off-state by directly connecting a partial path between the switching element and the current detection unit on the braking current path and the other end of the armature.

2 Claims, 4 Drawing Sheets

| RESISTOR $R_a$ | 0 Ω | 5.0 Ω |
|---|---|---|
| BRAKING CURRENT $I_f$ | 5.0 A | 5.0 A |
| POWER LOSS IN $R_a$ | 0 W | 70.0 W |
| POWER LOSS IN CIRCUIT | 13.8 W | 15.4 W |
| POWER LOSS IN ENTIRE DRIVE DEVICE | 13.8 W | 85.4 W |
| STOPPING TIME | 2.6 sec | 2.2 sec |

DRIVE DEVICE FOR SINGLE-PHASE SERIES COMMUTATOR MOTOR

CROSS-REFERENCE TO RELATED APPLICATIONS

This application claims the benefit of Japanese Patent Application No. 2011-083721 filed Apr. 5, 2011 in the Japan Patent Office, the disclosure of which is incorporated herein by reference.

BACKGROUND

The present invention relates to a drive device for a single-phase series commutator motor.

(Outline of a Single-Phase Series Commutator Motor)

A single-phase series commutator motor can be rotary-driven with either of a direct current (DC) power source and an alternating current (AC) power source, and therefore is called a universal motor. This kind of motor can rotate at a high speed, receives minimal influence from power supply frequency, and can be produced at low cost. Therefore, this kind of motor is widely used for an electric power tool powered by an AC power source.

The motor includes an armature winding and a field winding serially connected to each other. The motor is configured to be rotary-driven by a torque generated when a power source is serially connected to the armature winding and the field winding.

In the motor, regardless of polarity of the AC power source or the DC power source, a direction of the generated torque is fixed constantly to one direction unless a connection configuration of the armature winding and the field winding is changed.

By reversing a connecting direction of either one of the armature winding and the field winding, a switching of the direction of the generated torque is achieved.

Accordingly, an application in which the direction of the torque generated in the motor is switched can be achieved by providing single pole double throw switches at both ends of the field winding in order to switch the connecting direction.

(Braking of the Motor)

An example of the application in which the direction of the generated torque is switched is a braking required to stop the motor rapidly.

In this example, the braking of the motor is achieved by generating a counter torque in the motor that is being rotary-driven by the torque in one direction.

In a normal case, the armature winding and the field winding serially connected to each other are connected to a power source. By reversing a connecting direction of either one of the armature winding and the field winding, a current loop is formed in which both ends of these serially connected windings are connected with/without the resistor interposed therebetween. As a result, a torque in a direction reverse to that in the normal case is generated and the motor is thereby braked.

(Problems with the Above-Described Braking)

In performing the braking as above, a braking current corresponding to the number of rotations of the motor flows through the current loop during a period when the motor is braked. Therefore, an excessive current may flow at the beginning of the braking, and thus, the commutator of the motor disposed within the current loop may deteriorate due to the excessive current.

(Case Example of a Braking Current and a Constant Current Control)

In order to suppress the above-described problems, a device disclosed, for example, in Japanese Patent Publication No. 2,735,771 is configured as follows.

The device is configured to detect a braking current flowing through a braking current path formed of an armature and a field winding during a period when the motor is braked; to interrupt the braking current path when the braking current reaches a predetermined upper limit; and to connect both ends of the field winding via a resistor for consuming a current.

In the device configured as such, when the braking current reaches the predetermined upper limit, the both ends of the field winding are connected via the resistor for consuming current, and a circulating current flows through the field winding via the resistor. As a result, energy stored in the field winding is consumed by the resistor.

Then, in the device, when the circulating current flowing through the field winding via the resistor is decreased, the armature and the field winding form the braking current path again.

Consequently, according to the device, it is possible to stop the motor by generating a braking torque in the motor while the braking current is suppressed to or below the upper limit during the period when the motor is braked.

SUMMARY

In the device, however, since the both ends of the field winding are connected to the resistor for consuming current when the braking current reaches the predetermined upper limit, there is a problem that the resistor itself generates heat due to a current flowing through the resistor.

Therefore, in order to put the device into practical use, some heat radiation measures have to be taken to radiate heat generated in the resistor. Examples of such heat radiation measures include providing the resistor with a heat sink for heat radiation; using a large-sized resistor having excellent heat radiation properties; and the like. As a result, the device has a problem that it causes the motor, and thus an electric power tool constituted by the motor, to get larger in size.

Preferably, the present invention can provide a technology capable of suppressing heat generation caused by a braking of a single-phase series commutator motor without upsizing a drive device for the motor.

A drive device according to the present invention is a drive device for a single-phase series commutator motor including a field winding and an armature. The drive device includes a pair of drive switches, a first diode, a switching element, and a current detection unit. Each of the pair of drive switches is provided at either end of the field winding in the motor and is adapted to be able to switch between a drive position and a brake position. The drive position is a position that connects the field winding and the armature of the motor serially to an external power source, thereby to drive the motor. The brake position is a position that brakes the motor by connecting the field winding to the armature in a direction opposite to that at the time the motor is being driven. The first diode, the switching element, and the current detection unit are arranged, in this order from one end of the armature, on a braking current path that is formed of the armature and the field winding when the pair of drive switches is in the brake position. The first diode is adapted to allow a braking current to flow through the braking current path in one direction. The switching element is adapted to electrically conduct/interrupt the braking current path. The current detection unit is adapted to detect the braking current flowing through the braking current path.

The drive device further includes a capacitor for charge accumulation, a second diode, and a current control unit. The capacitor is disposed between a first partial path between the first diode and the switching element on the braking current path and an other end of the armature. The second diode is adapted to keep allowing the braking current to flow through the field winding when the switching element is in an off-state by directly connecting a second partial path between the switching element and the current detection unit on the braking current path and the other end of the armature. The current control unit is adapted to switch the switching element between on and off states so that the braking current detected by the current detection unit becomes a predetermined amount when the pair of drive switches is in the brake position.

In the drive device configured as such, when the drive switches are switched to the drive position, the field winding and the armature are serially connected to the external power source to rotate the motor in a predetermined one direction.

Since the armature is connected to the capacitor in parallel via the first diode, when the motor is rotating, a direct current voltage is applied to the capacitor via the first diode, and a charge is accumulated in the capacitor by the applied voltage.

Then, when the drive switches are switched to the brake position while the motor is in a rotating state, the field winding is connected to the armature in a direction opposite to that at the time the motor is being rotary-driven. As a result, the braking current path is formed of the armature and the field winding.

When the drive switches are switched from the drive position to the brake position, the switching element is turned to an on-state. As a result, the charge accumulated in the capacitor is discharged so as to go through the switching element, the current detection unit, the field winding, and the capacitor in this order.

Since the motor is rotating at such a time, an electromotive force is generated in the armature, and the braking current begins to flow through the braking current path. When the braking current flows as above, a torque (braking torque) in a direction reverse to that of rotation is generated in the motor (in other words, in the armature), and a rotation rate of the motor is decreased. In such a state, the braking current rises because the motor functions as a generator.

When the braking current further rises to exceed the predetermined amount, the current control unit switches the switching element to an off-state to suppress a rise in the braking current, and interrupts the braking current path from the armature to the field winding.

Furthermore, the drive device of the present invention includes the second diode that directly connects the second partial path between the switching element and the current detection unit to the other end of the armature.

Due to such a configuration, when the switching element is switched to the off-state as above and the braking current path from the armature to the field winding is interrupted, the braking current keeps flowing through the field winding via the second diode.

The braking current is a circulating current flowing through a closed loop constituted by the field winding and the second diode, and the braking current is decreased due to a resistance component included in the field winding and a resistance component included in the current detection unit provided on the closed loop. Then, when the braking current (circulating current) becomes less than the predetermined amount, the switching element is switched to an on-state by the current control unit.

After the switching element is switched to the on-state as above, on and off states of the switching element are switched through a process similar to the above until the rotation of the motor stops.

Also in a case where the switching element is controlled to the off-state as above and the braking current (circulating current) is flowing through the field winding via the second diode, the braking torque is generated in the motor to decrease the rotation rate thereof.

In the present invention, the circulation path allowing the braking current (circulating current) to keep flowing through the field winding when the switching element is in an off-state is constituted by the second diode and, therefore, a resistor is not provided on the circulation path as in prior art.

Consequently, in the drive device of the present invention, it is unnecessary to take heat radiation measures to suppress heat generation caused by the resistor because the braking current (circulating current) is not flowed through the resistor. As a result, it is possible to seek to downsize the drive device, and thus the electric power tool including the single-phase series commutator motor as a power source.

The current control unit may be adapted, in a case where the switching element is in an on-state, to switch the switching element to an off-state when the braking current becomes greater than a first threshold, and, in a case where the switching element is in an off-state, to switch the switching element to an on-state when the braking current becomes smaller than a second threshold, which is smaller than the first threshold.

According to the current control unit adapted as above, it is possible to suppress a so-called chattering from occurring, in which the switching element is repeatedly turned on and off when the braking current is close in value to a threshold. This is because a hysteresis is provided to a current value (the first threshold) at the time the switching element is switched to an off-state and another current value (the second threshold) at the time the switching element is switched to an on-state.

BRIEF DESCRIPTION OF THE DRAWINGS

The present invention will be described by way of example with reference to the accompanying drawings, in which.

DETAILED DESCRIPTION OF THE PREFERRED EMBODIMENTS

Figure 1:
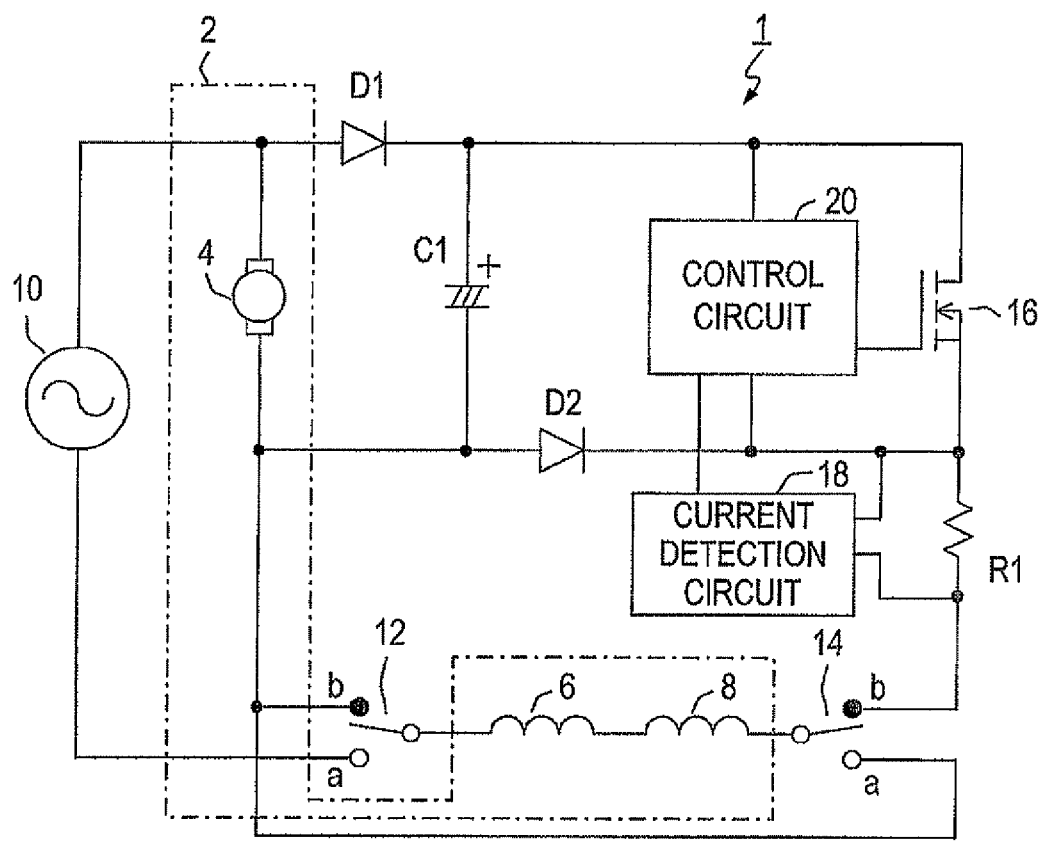
FIG. 1 is a circuit diagram showing a configuration of an entire drive device for a single-phase series commutator motor of an embodiment.

As shown in FIG. 1, a drive device 1 of the present embodiment is supplied with electric power from an external AC power source 10 to drive a motor 2, which is a single-phase series commutator motor. The drive device 1 includes a pair of drive switches 12 and 14. The pair of drive switches 12 and 14 is respectively connected to either end of a pair of serially connected field windings (so-called field coils) 6 and 8 provided on the motor 2.

The motor 2 of the present embodiment is used as a power source for an electric power tool (e.g., an electric screwdriver or the like). Each of the drive switches 12 and 14 is interlocked with an operation switch (not shown), which is provided on the electric power tool and can be operated by a user of the electric power tool. More specifically, when the operation switch is not operated, each of the drive switches 12 and 14 is switched to a side of a contact 'b' indicated by a solid circle in FIG. 1, and when the operation switch is operated, each of the drive switches 12 and 14 is switched to a side of a contact 'a' indicated by a hollow circle in FIG. 1.

When each of the drive switches 12 and 14 is switched to the side of the contact 'a' (hereinafter referred to as a drive position), the field winding 6 is connected to the AC power source 10 via the drive switch 12, and the field winding 8 is connected to an armature 4 via the drive switch 14. The armature 4 in the present embodiment includes a commutator.

As a result, when each of the drive switches 12 and 14 is switched to the drive position, a drive current path of the motor 2 is formed of the AC power source 10, the armature 4, and the field windings 8 and 6. In the drive current path, a drive current that drives the motor 2 flows through the AC power source 10, the armature 4 (specifically, the commutator and an armature winding) and the field windings 8 and 6 in this order. The motor 2 is thereby rotated in one direction.

In contrast, when an operation of the operation switch of the electric power tool is stopped and each of the drive switches 12 and 14 is switched to the side of the contact (hereinafter referred to as a brake position), the field windings 6 and 8 are connected to the armature 4 in a direction opposite to that at the time the motor 2 is being driven.

In other words, to one end side of the armature 4 connected to the AC power source 10, the field winding 8 is connected via the drive switch 14, and to the other end side of the armature 4, the field winding 6 is connected via the drive switch 12.

Provided on a current path connecting between the one end side of the armature 4 and the contact 'b' of the drive switch 14 are a diode D1, an PET 16, and a resistor R1 in this order from the one end side of the armature 4. The diode D1 is provided on the current path to allow a current to flow in a direction from the armature 4 to the drive switch 14. The PET 16 is provided to electrically conduct/interrupt the current path. The resistor R1 is provided to detect the current flowing through the current path.

A current path between the diode D1 and the PET 16 is connected to the other end of the armature 4 via a capacitor C1 for charge accumulation. The other end of the armature 4 is also connected to a current path between the PET 16 and the resistor R1 via a diode D2.

As for the diode D2, an anode of the diode D2 is directly connected to the other end of the armature 4 as well as to the contact 'b' of the drive switch 12, and a cathode of the diode D2 is directly connected to the current path between the FET 16 and the resistor R1.

Furthermore, between the current path between the diode D1 and the FET 16; and a current path between the diode D2 and the FET 16 (in other words, a current path between the diode D2 and the resistor R1), a control circuit 20 is connected. The control circuit 20 receives power supply from each of the current paths to drive-control the FET 16.

To the control circuit 20, a current detection circuit 18 is connected. The current detection circuit 18 detects a voltage between both ends of the resistor R1 and outputs a detection signal to the control circuit 20 based on the detected voltage. The detection signal indicates a value of current flowing through the resistor R1, and thus the field windings 6 and 8.

The control circuit 20 performs a braking current control process (see FIG. 2) when the drive switches 12 and 14 are in the brake position (on the side of the contact 'b'). Specifically, the control circuit 20 detects a value of a current (braking current) flowing through the field windings 6 and 8 via the current detection circuit 18, and switches the FET 16 between on and off states so that the value of the detected current becomes a desired one. The control circuit 20 is constituted by a microcomputer, a hysteresis circuit not using a microcomputer, a combination of these, or the like.

A description will be given below with reference to the braking current control process (see FIG. 2) as to an operation of the drive device 1 from when the drive switches 12 and 14 are switched to the brake position while the motor 2 is being rotary-driven until when rotation of the motor 2 stops.

First, when the drive switches 12 and 14 are in the drive position (on the side of the contact 'a') and the motor 2 is rotary-driven, a direct current voltage is applied to the capacitor C1 because the capacitor C1 is connected in parallel to the armature 4 via the diode D1. As a result, a charge is accumulated in the capacitor C1.

Figure 2:
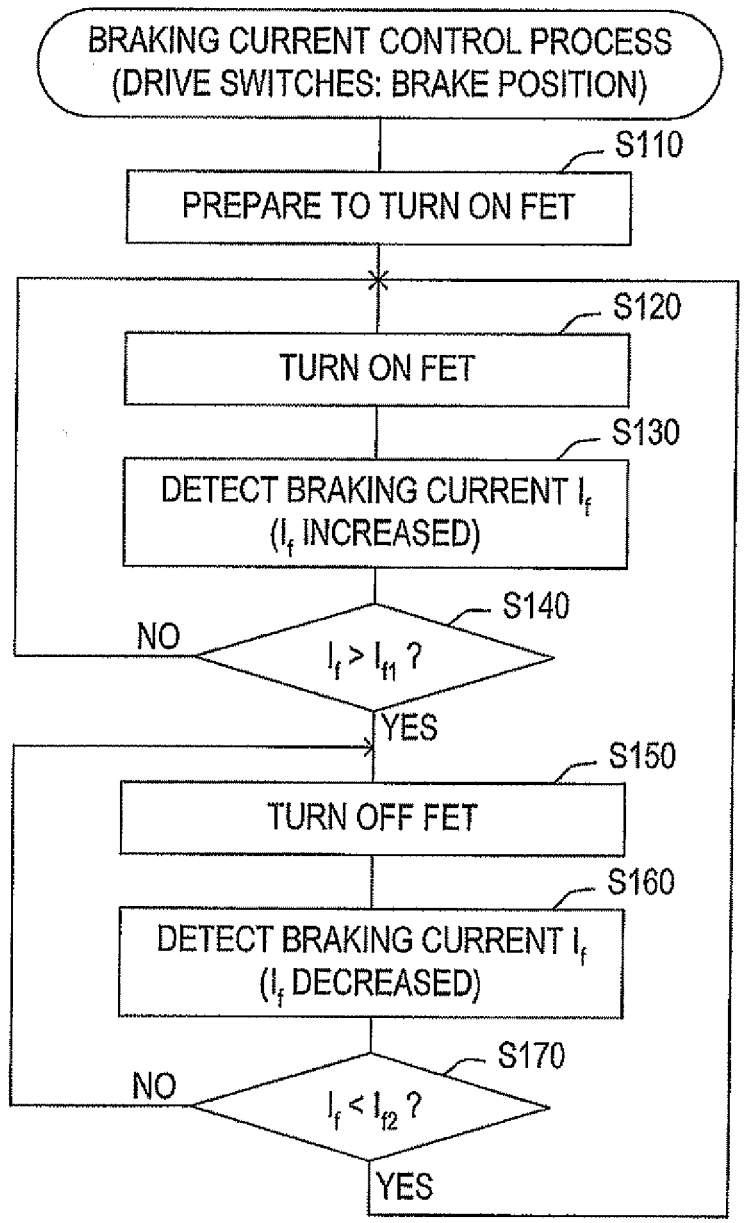
FIG. 2 is a flowchart showing a braking current control process performed in a control circuit.

Next, when the drive switches 12 and 14 are switched to the brake position (on the side of the contact 'b') while the motor 2 is being rotary-driven, the control circuit 20 operates with power supply received from the capacitor C1 to perform the braking current control process shown in FIG. 2.

In the braking current control process, a preparation processing to generate a drive voltage for the PET 16 to turn on the FET 16 is first performed in S110 (S stands for Step). Then, in the subsequent S120, the FET 16 is turned on by applying the drive voltage to a gate of the FET 16.

As a result, a current path starting from the capacitor C1, passing through the FET 16, the resistor R1, the field winding 8 and the field winding 6, and ending at the capacitor C1 is formed, and the charge accumulated in the capacitor C1 is discharged on the current path.

Figure 3A:
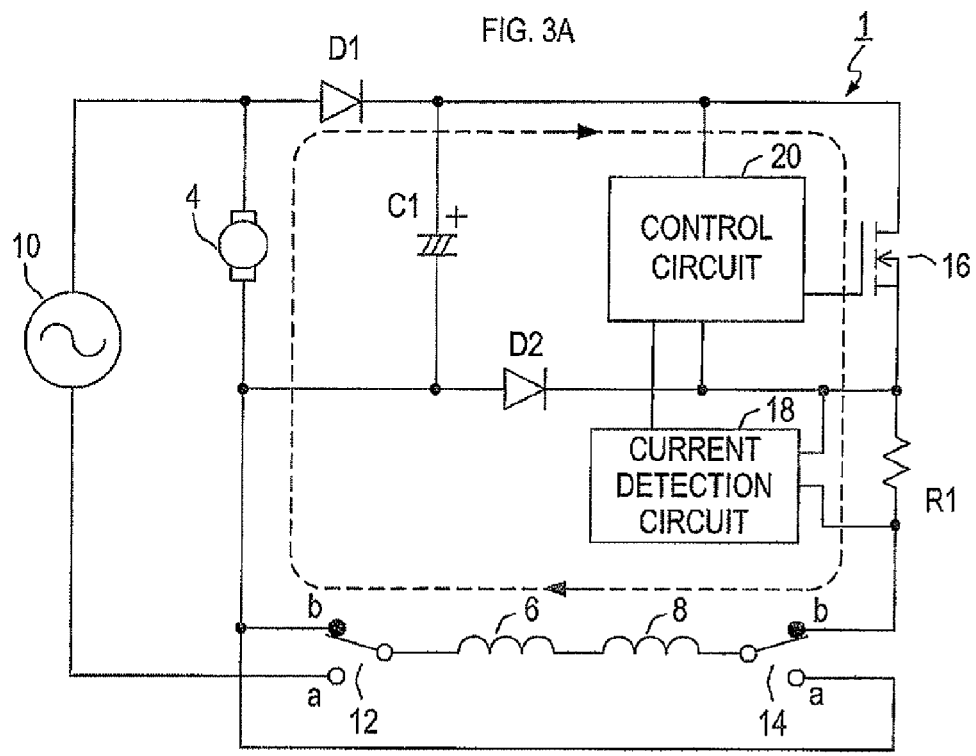
FIG. 3A is an explanatory diagram showing a braking current path when an FET is turned on in the braking current control process.

Since the motor 2 is rotating at such a time, an electromotive force is generated in the armature 4 and, as shown in FIG. 3A, a braking current begins to flow through a braking current path starting from the armature 4, passing through the diode D1, the FET 16, the resistor R1, the field winding 8 and the field winding 6, and ending at the armature 4.

When the braking current flows as above, a torque (braking torque) is generated in the motor 2 (in other words, in the armature 4) in a direction reverse to that of the rotation, and a rotation rate of the motor 2 is decreased. In such a situation, the braking current rises because the motor 2 functions as a generator.

If the braking current rises too high, the above-described disadvantages such as deterioration of the commutator may arise. Therefore, in the braking current control process, after the FET 16 is turned on in S120, the process proceeds to S130 to detect a value of a braking current (so-called a field current) $I_f$ flowing through the field windings 6 and 8 via the current detection circuit 18.

In the subsequent S140, it is determined whether or not the value of the braking current $I_f$ detected in S130 exceeds a first threshold $I_{f1}$ set in advance. If the value of the braking current $I_f$ does not exceed the first threshold in ($I_f < I_{f1}$), the process proceeds to S120, and the above processings of S120 and S130 are performed again.

In contrast, if the value of the braking current $I_f$ exceeds the first threshold In ($I_f > I_{f1}$), the process proceeds to S150, and the FET 16 is turned off by stopping applying the drive voltage to the gate of the FET 16.

Figure 3B:
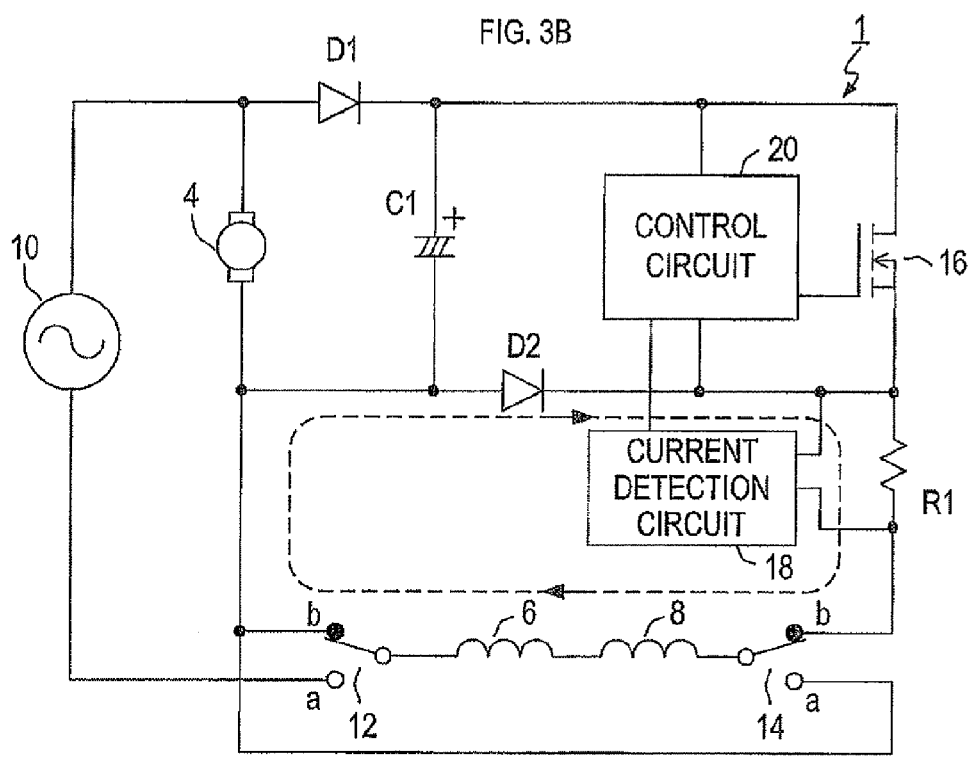
FIG. 3B is an explanatory diagram showing a braking current path when the FET is turned off in the braking current control process.

As a result, a braking current path starting from the armature 4, passing through the diode D1 and the FET 16, and ending at the resistor R1 is interrupted. When the braking current path is interrupted, a current path (circulation path) shown in FIG. 3B, starting from the field winding 6, passing through the diode D2, the resistor R1, and the field winding 8, and ending at the field winding 6 is formed.

Through the circulation path, a braking current continuously flows by means of energy stored in the field windings 6 and 8. Since the braking current is a circulating current, the braking current is gradually decreased by resistance components included in the field windings 6 and 8 and the resistor R1.

Therefore, in the braking current control process, after the FET 16 is turned off in S150, the process proceeds to S160 to detect a value of the braking current $I_f$ flowing through the field windings 6 and 8 via the current detection circuit 18.

In the subsequent S170, it is determined whether or not the value of the braking current $I_f$ detected in S160 is less than a second threshold $I_{f2}$ (where $I_{f2}<I_{f1}$) set in advance. If the value of the braking current $I_f$ is not less than the second threshold $I_{f2}$ ($I_f \geq I_{f2}$), the process proceeds to S150, and the above processings of S150 and S160 are performed again.

If the value of the braking current $I_f$ is less than the second threshold $I_{f2}$ ($I_f<I_{f2}$), the process proceeds to S120 and the processings of and after S120 are performed again.

The above-described braking current control process is repeatedly performed until the rotation rate of the motor 2 is sufficiently decreased and the operation of the control circuit 20 with electrical power generated by the armature 4 is stopped.

Also in a case where the FET 16 is switched to an off-state as above and the circulating current is flowing through the field windings 6 and 8 via the diode D2, the braking torque is generated in the motor 2 to decrease the rotation rate thereof.

Specifically, when the circulating current is flowing through the field windings 6 and 8, an electromotive force is generated in the armature 4 if the motor 2 is rotating. In such a situation, a short-circuit current flows through a portion in which an armature winding inside the motor 2 is short-circuited by the commutator, and a copper loss occurs due to the short-circuit current. As for the copper loss, the lower the rotation rate of the motor 2 is, the greater the rate of loss is.

When the motor 2 is rotating, a magnetic flux generated by the circulating current flowing through the field windings 6 and 8 is also changed. As a result, an eddy current loss and/or a hysteresis loss occur inside cores of the field windings 6 and 8. As for these losses, the higher the rotation rate of the motor 2 is, the greater the rate of loss is.

Accordingly, even when the circulating current is flowing through the field windings 6 and 8, the braking force is generated in the motor 2 due to the above-described copper loss, eddy current loss, hysteresis loss and/or the like, and the rotation rate of the motor 2 is decreased.

As described above, in the drive device 1 for the motor 2 of the present embodiment, the circulation path, in which the braking current (circulating current) is kept flowing through the field windings 6 and 8 when the FET 16 is in the off-state, is constituted only by the diode D2, and a resistor for consuming current is not provided on the circulation path. Therefore, heat generation caused by the resistance component included in the circulation path is suppressed.

Consequently, in the drive device 1 for the motor 2 of the present embodiment, since it is unnecessary to take heat radiation measures to suppress heat generation caused by the resistor for consuming current, it is possible to seek to downsize the drive device 1, and thus the electric power tool including the motor 2 as a power source.

Figures 4A, 4B:
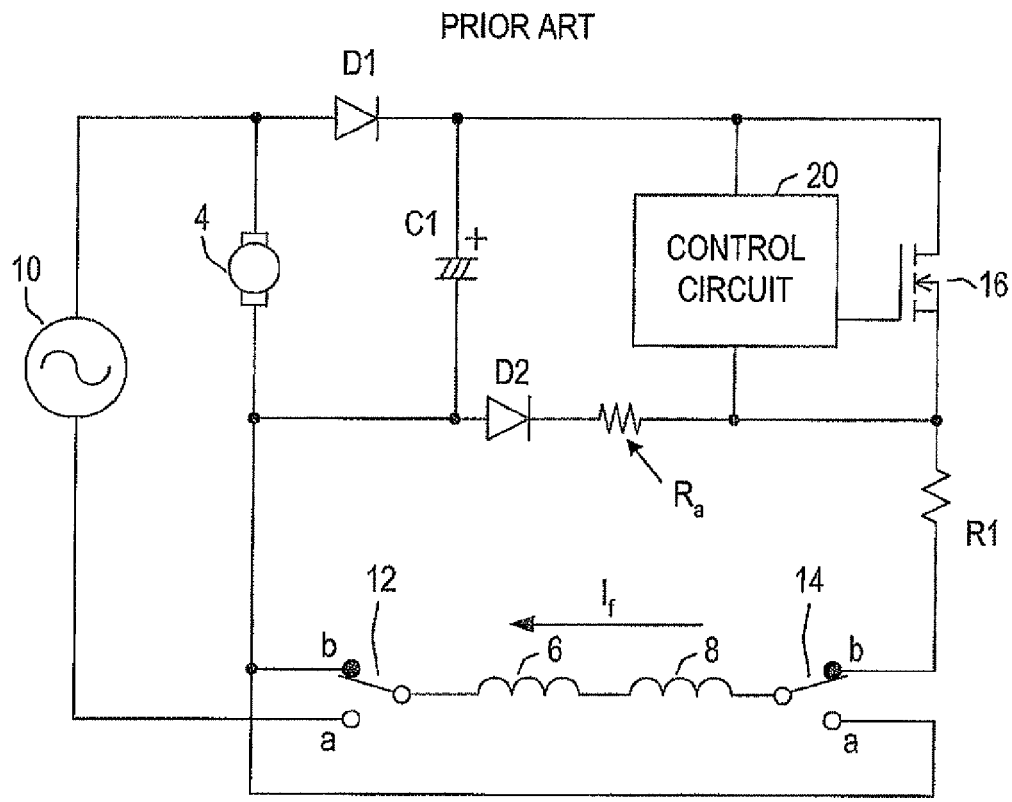
FIG. 4A is a circuit diagram showing a configuration of an entire drive device for a single-phase series commutator motor in prior art.
FIG. 4B is an explanatory diagram showing results of measurements of power losses occurring during braking and a stopping time.

Specifically, in the above-described prior art, in order to rapidly decrease a circulating current and to enable the FET 16 to be switched to an on-state by the control circuit 20 in a shorter time, a resistor $R_a$ with a greater resistance value is provided on the circulation path formed of the diode D2, as shown in FIG. 4A, to actively consume a rotational energy of the motor 2.

On the other hand, the circulation path of the present embodiment is constituted only by the diode D2 and, therefore, such a circulation path is equal to that including the resistor $R_a$, which has a resistance value of zero, provided thereon. Consequently, in the circulation path of the present embodiment, since heat generation caused by the circulating current (braking current) is suppressed, it is possible to seek to downsize the drive device 1, and thus the electric power tool.

FIG. 4B shows results of measurements performed on a condition that resistance value of the resistor $R_a$ on the circulation path shown in FIG. 4A is set to 5Ω and on a condition that the resistance value of the resistor $R_a$ is set to 0Ω. More specifically, FIG. 4B shows results of measurements of a stopping time required until the motor 2 stops, a power loss occurring in the resistor $R_a$, a power loss occurring in the circuit excluding the resistor $R_a$, and a power loss occurring in the entire drive device, on a condition that the drive switches 12 and 14 are switched from the drive position to the brake position; and the control circuit 20 controls the FET 16 so that a value of the braking current $I_f$ detected via the resistor R1 becomes 5A.

As seen from the results of the measurements, in a case where the resistance value of the resistor $R_a$ is set to 0Ω (i.e., in a case where the resistor $R_a$ is not provided) as in the present embodiment, there is no power loss occurring in the resistor $R_a$. Therefore, as compared to a case where the resistor $R_a$ having a resistance value of 5Ω, for example, is provided as in the prior art, a power loss occurring in the entire drive device is decreased and a heat generation amount can be reduced.

Moreover, in the present embodiment, since the energy stored in the field windings 6 and 8 can be consumed by the above-described copper loss, eddy current loss, hysteresis loss and the like, the time required until the motor 2 stops (stopping time) is only slightly changed from 2.2 seconds to 2.6 seconds.

Consequently, according to the present embodiment, the stopping time of the motor 2 does not become significantly longer than that in the prior art and, therefore, a braking performance with practically no problem can be obtained.

Furthermore, in the present embodiment, two thresholds, i.e., the first threshold $I_{f1}$ and the second threshold $I_{f2}$ that is smaller than the first threshold $I_{f1}$, are set as thresholds for the braking current, which are used by the control circuit 20 to switch the FET 16 between on and off states.

In a case where the FET 16 is in an on-state and the braking current $I_f$ is increasing, the FET 16 is switched to an off-state when the value of the braking current If exceeds the first threshold $I_{f1}$. In a case where the FET 16 is in an off-state and the braking current $I_f$ is decreasing, the FET 16 is switched to an on-state when the value of the braking current $I_f$ becomes smaller than the second threshold $I_{f2}$.

Consequently, according to the present embodiment, it is possible to suppress a chattering from occurring, in which the FET 16 is repeatedly turned on and off when the braking current $I_f$ is close in value to a threshold, as in a case where a single threshold for the braking current $I_f$ is set.

In the present embodiment, the diode D1 corresponds to an example of a first diode of the present invention; the diode D2 corresponds to an example of a second diode of the present invention; the FET 16 corresponds to an example of a switching element of the present invention; the resistor R1 and the current detection circuit 18 correspond to an example of a current detection unit of the present invention; and the control circuit 20 corresponds to an example of a current control unit of the present invention.

While one embodiment of the present invention has been described so far, the present invention is not limited to the embodiment. Various forms can be taken without departing from the scope and the spirit of the present invention.

For example, in the above embodiment, what forms the circulation path together with the field windings 6 and 8 when the FET 16 is in an off-state is only the diode D2. However, in addition to the diode D2, an additional switching element (an FET or the like) that switches whether to form the circulation path or not may be provided on the circulation path.

Specifically, in such a case, if the additional switching element is switched to an on-state, the resistance component included in the circulation path can be approximately the same as that in a case where the circulation path is formed only of the diode D2 because the additional switching element is low loss. Therefore, an effect similar to that in the above embodiment can be obtained.

Alternatively, the drive device 1 may be configured to selectively switch between the braking current path and the circulation path by using a switching element that can switch current paths.

Moreover, in the above embodiment, it has been described, for example, that the resistor R1 that detects a braking current (circulating current) flowing through the field windings 6 and 8 is provided on the path common to the braking current path and the circulation path. However, a current sensor that can detect a braking current (circulating current) flowing through the common path in a noncontact manner using electromagnetic induction, for example, may be provided instead of the resistor R1.

In the drive device configured as such, heat generation caused by power consumption at the resistor R1 can be also suppressed. As a result, a rise in temperature of the drive device can be more preferably suppressed.

Furthermore, in the above embodiment, it has been described that the FET 16 is used as a switching element used for current control. However, anything can be used as the switching element as long as being capable of electrically conducting/interrupting a current path. Therefore, other semiconductor device such as bipolar transistor and the like may be used.

What is claimed is:

1. A drive device for a single-phase series commutator motor including a field winding and an armature, the drive device comprising:
a pair of drive switches, each of which is provided at either end of the field winding in the motor, the pair of drive switches being adapted to be able to switch between a drive position, which is a position that connects the field winding and the armature of the motor serially to an external power source to drive the motor, and a brake position, which is a position that brakes the motor by connecting the field winding to the armature in a direction opposite to that at the time the motor is being driven;
a first diode, a switching element, and a current detection unit that are connected in series, in this order from one end of the armature, on a braking current path that is formed of the armature and the field winding when the pair of drive switches is in the brake position, the first diode being adapted to allow a braking current to flow through the braking current path in one direction, the switching element being adapted to electrically conduct/interrupt the braking current path, and the current detection unit being adapted to detect the braking current flowing through the braking current path;
a capacitor for charge accumulation disposed between a first partial path between the first diode and the switching element on the braking current path and an other end of the armature;
a second diode adapted to keep allowing the braking current to flow through the field winding when the switching element is in an off-state by directly connecting a second partial path between the switching element and the current detection unit on the braking current path and the other end of the armature without a resistor between the second partial path and the other end of the armature;
a control unit adapted to switch the switching element between on and off states so that the braking current detected by the current detection unit becomes a predetermined amount when the pair of drive switches is in the brake position, and
a current detection circuit detects a voltage between both ends of the current detection unit and outputs a detection signal to the control unit based on the detected voltage, the detection signal being indicative of a value of current flowing through the current detection unit and thus the field winding of the motor,
wherein the current detection unit is further adapted to be such that the braking current flows through the current detection unit when the switching element is in an on-state as well as when the switching element is in an off-state.

2. The drive device according to claim 1,
wherein the control unit is adapted, in a case where the switching element is in an on-state, to switch the switching element to an off-state when the braking current becomes greater than a first threshold, and, in a case where the switching element is in an off-state, to switch the switching element to an on-state when the braking current becomes smaller than a second threshold, which is smaller than the first threshold.

* * * * *